United States Patent [19]

Mauws

[11] Patent Number: 5,094,313
[45] Date of Patent: Mar. 10, 1992

[54] UTILITY VEHICLE

[76] Inventor: Laurence J. Mauws, Box 1290, Portage la Prairie, Manitoba, Canada, R1N 3L5

[21] Appl. No.: 562,692

[22] Filed: Aug. 6, 1990

[51] Int. Cl.⁵ .................. B62D 61/08; B62D 21/02
[52] U.S. Cl. ........................ 180/210; 180/215; 180/89.1; 180/311; 180/908; 296/205
[58] Field of Search ............. 180/210, 211, 215, 216, 180/271, 89.1, 89.11, 311, 291, 908; 280/282, 727, 756, DIG. 5, 796, 798; 296/203, 204, 205

[56] References Cited

U.S. PATENT DOCUMENTS

| | | | |
|---|---|---|---|
| 4,533,172 | 8/1985 | Oliver | 296/205 |
| 4,660,345 | 4/1987 | Browning | 296/205 |
| 4,798,400 | 1/1989 | Kosuge | 180/311 |
| 4,799,708 | 1/1989 | Handa et al. | 296/205 |
| 4,828,017 | 5/1989 | Watanabe et al. | 296/205 |

FOREIGN PATENT DOCUMENTS 883924  4/1943  France .................. 296/205

*Primary Examiner*—Charles A. Marmor
*Assistant Examiner*—Tamara L. Finlay
*Attorney, Agent, or Firm*—Murray E. Thrift; Stanley G. Ade; Adrian D. Battison

[57] ABSTRACT

A small, three wheeled utility vehicle has a front steering wheel and two rear drive wheels driven by an automotive engine and transaxle unit. The vehicle has a frame composed of tubular steel parts welded together to provide a complete cage around the passenger compartment and an engine and cargo area behind the passenger compartment. The body of the vehicle is composed of body panels mounted within the tubular frame.

9 Claims, 3 Drawing Sheets

UTILITY VEHICLE

FIELD OF THE INVENTION

The present invention relates to motorized vehicles and more particularly to a small utility vehicle that is especially suited for short-run, multi stop urban use.

BACKGROUND

In a heavy traffic urban environment, it is often desirable to have a small, highly manoeuverabe vehicle for such uses as monitoring parking, short-run or frequent stop deliveries, parcel services, and so on. A vehicle for this purpose should provide for easy access and exit from either side by the driver, high manoeuverability and good fuel economy. The vehicle should have a weather proof cab and it should be safe and relatively inexpensive.

The present invention is concerned with the provision of a vehicle that addresses this need.

SUMMARY

According to one aspect of the present invention there is provided a motorized vehicle having a front end and a rear end and comprising:

a passenger compartment at the front end;

a front steerable wheel positioned forwardly of the passenger compartment;

an engine compartment immediately rearwardly of the passenger compartment;

an engine and transaxle assembly mounted in the engine compartment; and two rear drive wheels mounted on the vehicle rearwardly of the passenger compartment and operatively connected to the transaxle to be driven thereby.

The tricycle layout, with a front passenger compartment and rear engine is efficient and very stable in a small vehicle. With the use of an engine and transaxle, the vehicle wheel base may be very short, providing high manoeuverability. In addition, this arrangement can be much lighter in weight than an arrangement using an engine, transmission and drive shaft power train. The reduced vehicle weight leads to improved efficiency and reduced manufacturing costs.

According to another aspect of the present invention there is provided a motorized vehicle comprising:

a frame consisting of a plurality of tubular members secured together to provide a structurally rigid cage having a passenger compartment at a front end and an engine compartment rearwardly thereof;

a front steerable wheel assembly mounted on the frame in front of the passenger compartment; and two rear drive wheels mounted rearwardly of the passenger compartment.

The tubular external frame is lightweight and very strong. The frame provides a complete roll cage for the passenger compartment. It is inexpensive to construct and provides a complete support structure for simple body panels that may preferably be mounted on the inside. It also provides adequate space for the transaxle rear wheel drive in a narrow, e.g., four foot wide vehicle.

This "cage" concept provides sufficient structural rigidity along with sufficient space at the front that a large front wheel and a motorcycle type telescoping fork suspension may be used.

The vehicle frame is preferably constructed with vertically oriented side hoops joined by transverse tubes to provide the passenger compartment. The engine and cargo space is provided by horizontally oriented hoops extending to the rear of the passenger compartment. The large vertical hoops allow the use of large doors for easy entry to and exit from the vehicle.

BRIEF DESCRIPTION OF THE DRAWING

In the accompanying drawings which illustrate and exemplary embodiment of the present invention.

DETAILED DESCRIPTION

Figure 1:
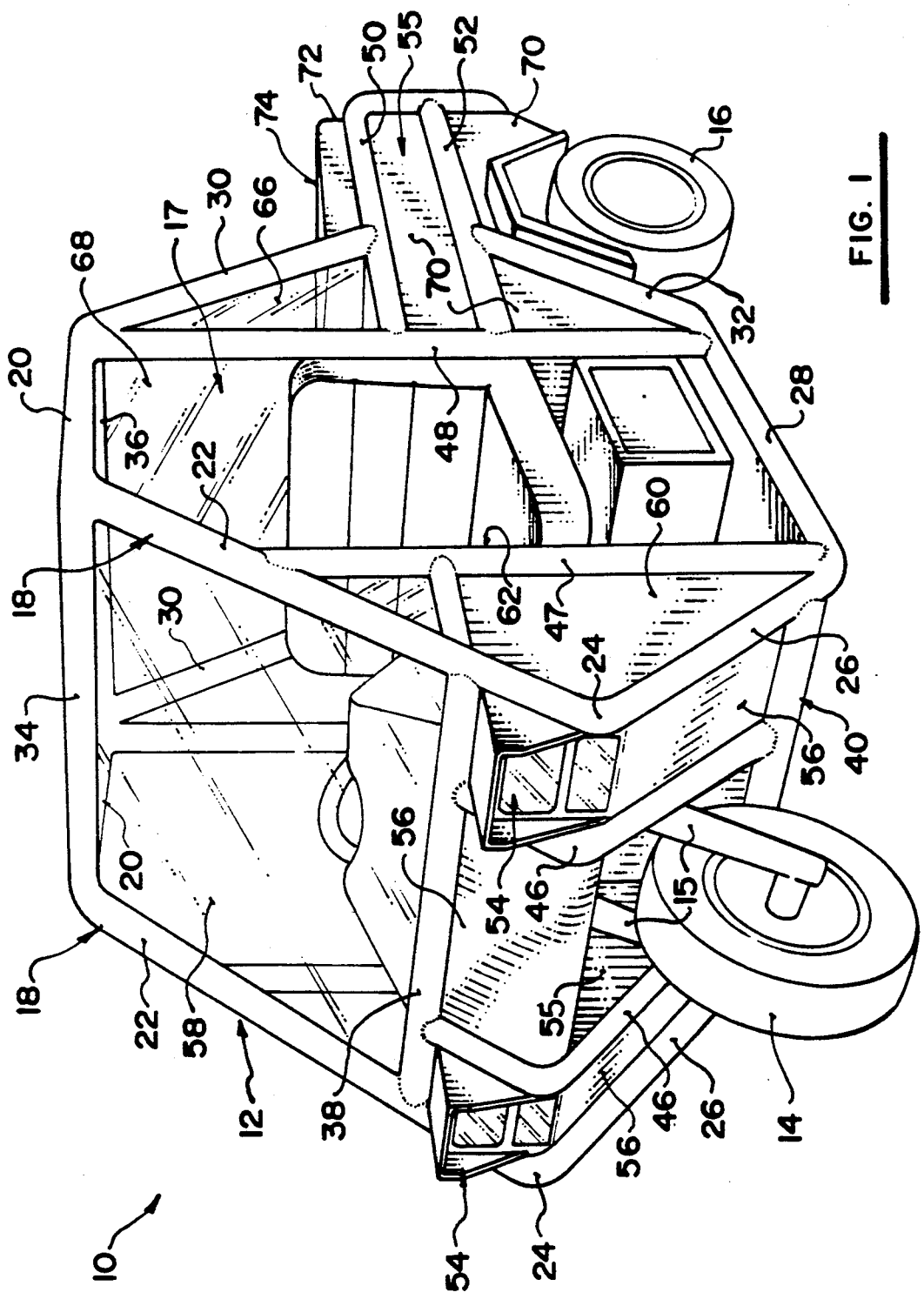
FIG. 1 is an isometric representation of a vehicle according to the present invention.
Figure 2:
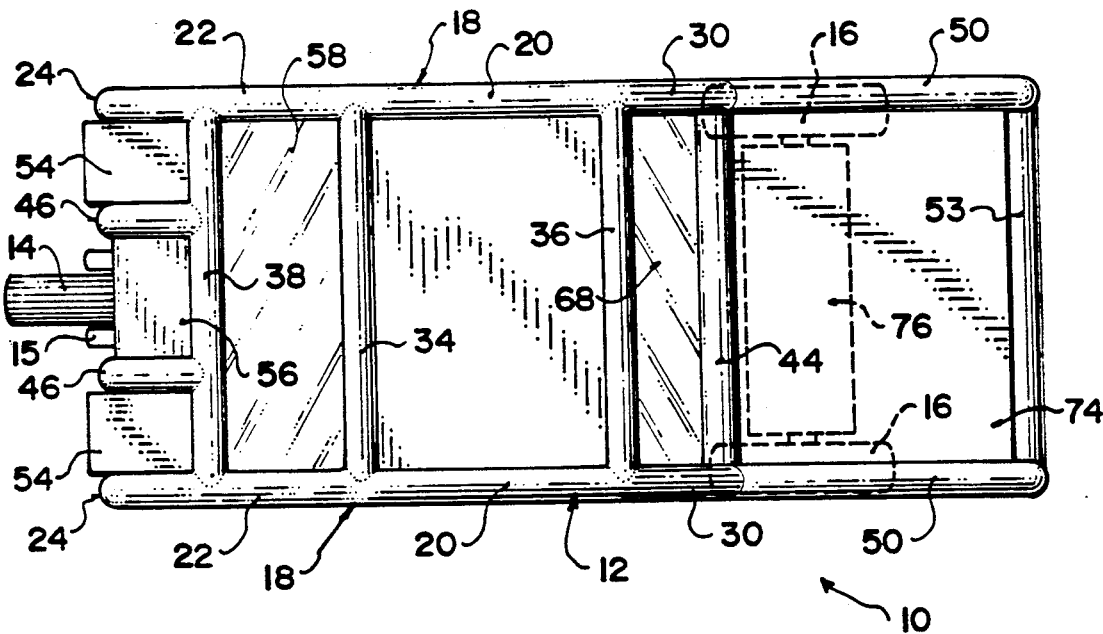
FIG. 2 is a plane view of the vehicle.
Figure 3:
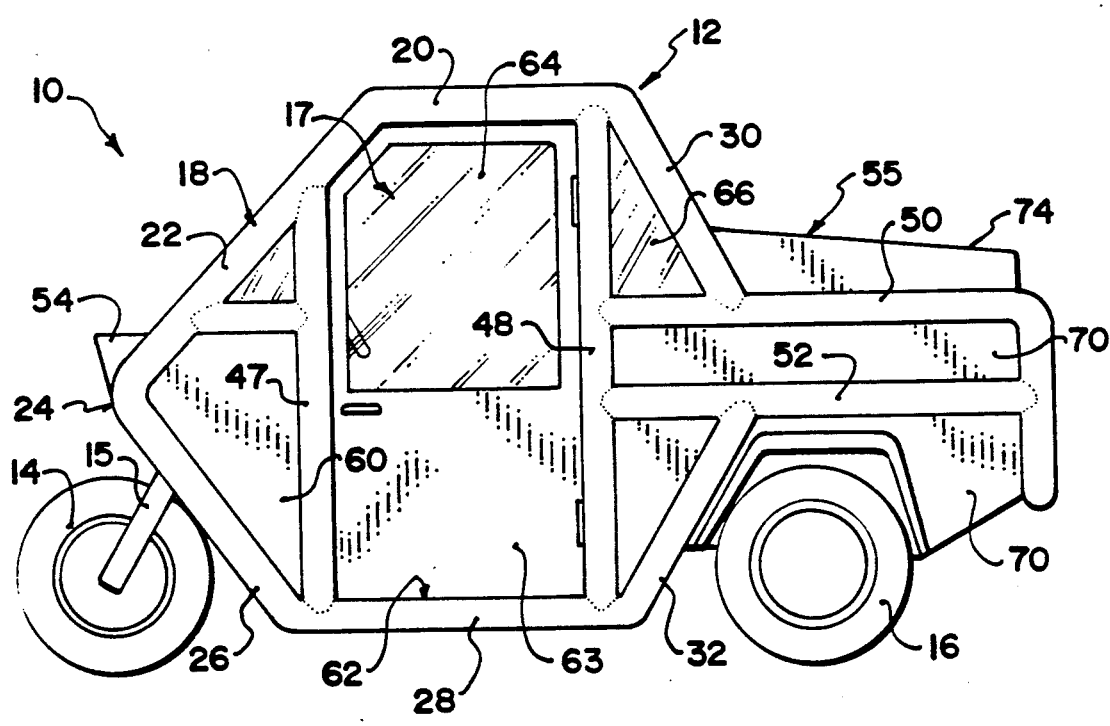
FIG. 3 is a side view of the vehicle.
Figure 4:
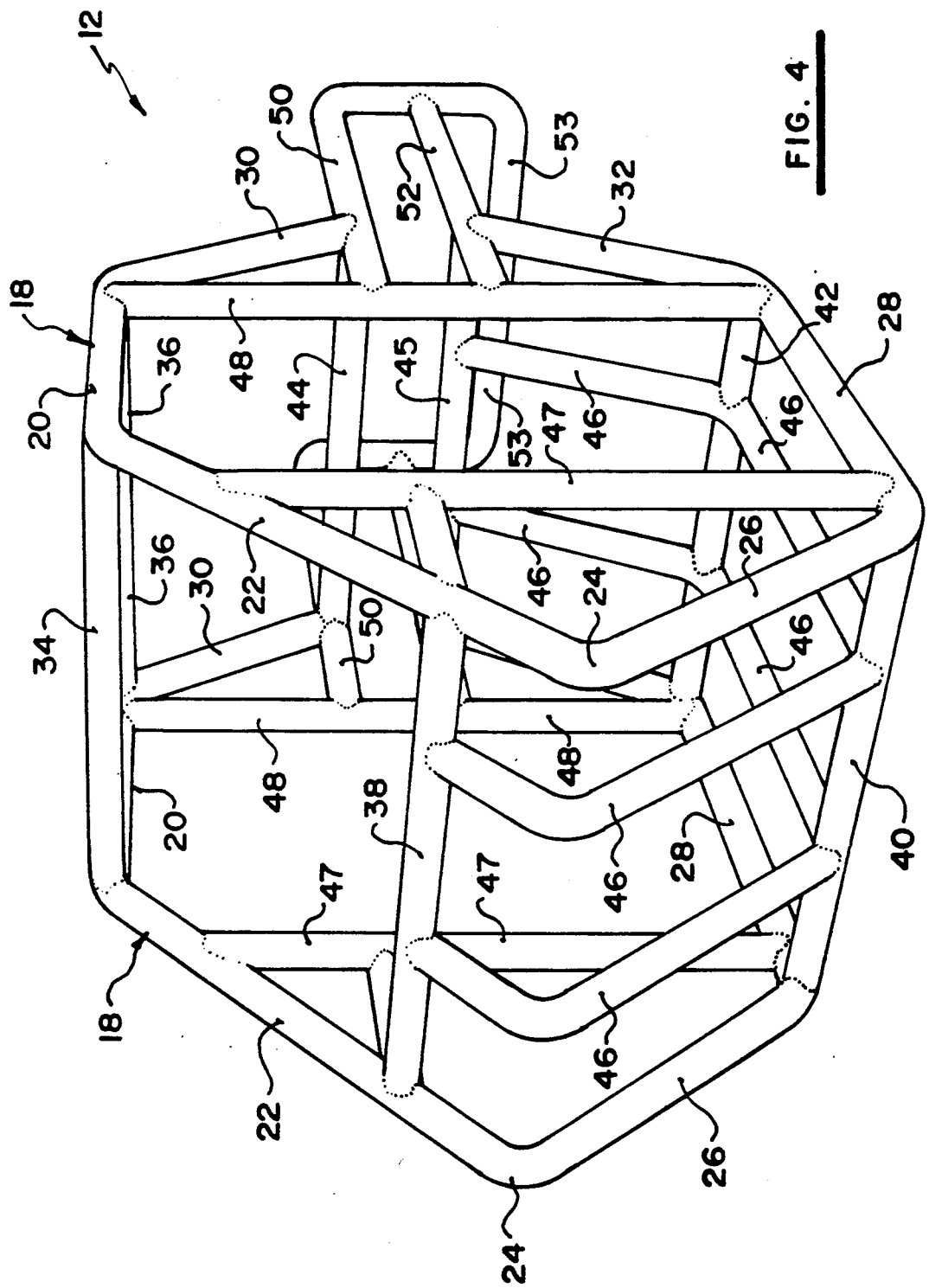
FIG. 4 is an isometric view of the vehicle frame.

Referring to the accompanying drawings, there is illustrated a vehicle 10 having an external frame 12 composed of tubular steel components. The vehicle is supported on a front steering wheel 14 and two rear drive wheels 16.

The frame encompasses a passenger compartment 17 at the front of the vehicle. This is defined by two vertically arranged side hoops 18, each made from a single tube bent to provide a number of linear sections. These include a top section 20, and a top front section 22 leading from the top section down to a front bend 24 at the front end of the vehicle. A bottom front section 26 leads from the bend 24 downwardly and rearwardly to a horizontal bottom section 28. At the rear end of the top section 20 is a top rear section 30 that slopes downwardly and to the rear. At the rear end of the bottom section 28 is a bottom rear section that slopes upwardly and to the rear.

The two side hoops are joined by laterally-oriented cross members, including two roof members, two floor members, a front member and two rear members. One of the roof members is a top front cross member 34, joining the hoops where the top and top front sections 20 and 22 meet. The other roof member is a top rear cross member 36 joins the hoops where the tops and top rear sections 20 and 30 meet. The front cross member 38 joins the two hoops slightly above the front bends 24. The floor members include a bottom front cross member 40 joining the hoops where the bottom front and bottom sections 26 and 28 meet. The other floor member is a bottom rear cross member 42 joining the hoops where the bottom and bottom rear sections 28 and 32 meet. The ends of the hoops are joined by the rear cross members 44 and 45.

Parallelling the lower parts of the hoops 18 are two center support tubes 46. These extend from the front cross member 38 to the rear cross member 45, parallel to the lower sections of the hoops.

A vertical front door post 47 joins the frame sections 22 and 26 on each side.

A vertical rear door post 48 is mounted on each side of the frame and extends between the top and bottom sections 20 and 28 of the associated hoop.

At the rear end of the vehicle on each side are two parallel, frame members 50 and 52. These extend rearwardly from the door posts and are connected to the ends of the hoop sections 30 and 32 at the back of the vehicle. The upper members 50 turn downwards across the ends of the members 52 and then bend laterally to a common member 53 across the back of the vehicle.

All of the components of the frame are made from tubular steel bent as necessary and welded together. This provides a lightweight and very strong frame structure. The frame surrounds the passenger compartment 17 and a rear engine and cargo compartment 55.

Between the side hoops 18 and the adjacent center tubes 46, above the front bends 24, are headlights 54. Below bends 24, between members 46 is a recess 55 that accommodates the front wheel 14 which is carried on a motorcyle type front fork 15. The remainder of the front of the vehicle is enclosed with front body panels 56 secured to the side hoops 18 and the center tubes 46. Between the front cross member 38 and the top front cross member 34 is a windshield panel 58, secured to the frame components.

On each side of the vehicle ahead of the door post 47 is a short, fixed side panel 60. Between the door posts 47 and 48 is a door opening 62 that may be closed by a removable door 63. The door in the illustrated embodiment pivots outwardly about hinges on the door post 48 so that it can lie along side the frame to the rear of the door post. The door can be latched in this position to provide for repeated entry and exit from the vehicle at frequent intervals. In an alternative embodiment (not illustrated) the door slides from the closed position to an open position at the rear of the door post 48. The upper part of the door includes a window pane 64.

To the rear of the door post 48, and above the upper horizontal member 50 is a small window 66. A back panel in the form of a rear window 68 fills the space between the side hoops 18, the rear cross member 44 and the top rear cross member 36.

The body of the vehicle is completed with side panels 70, a rear panel 72 and a rear deck 74 forming a box-like housing at the rear.

All of the body panels of the vehicle are mounted within the frame, so that the exterior dimensions of the vehicle are limited by the frame. This provides maximum usable space inside a vehicle of small exterior size.

The power plant 76 for the vehicle is a conventional, off the shelf engine-transaxle unit for a small automobile. The currently used unit is a 1.3 liter automotive engine transaxle assembly from KIA Motors of Korea. Units of this sort are generally mounted in the front of an automobile to drive the front, steerable wheels of an automobile. In the present instance, the complete drive unit can fit directly into the space immediately behind the passenger compartment. The unit preferably has an automatic transmission to minimize the effort required of the driver in heavy traffic, frequent stop service.

The resulting vehicle is a small, highly manoeuverable, lightweight vehicle ideal for local deliveries, parking monitoring and mail services. Because the frame is made of tubular steel it is lightweight and very strong. It provides a complete roll cage for the passenger compartment. Because the frame is external, a small vehicle, approximately four feet in overall width, can accommodate an automotive engine and transaxle unit. The mounting of the body panels, including a floor, is extremely simple.

While one embodiment of the present invention has been described in foregoing, it is to be understood that other embodiments are possible within the scope of the invention. The invention is to be considered limited solely by the appended claims.

I claim:

1. A vehicle frame for a three-wheeled street vehicle, having a front end and a rear end, comprising:

two upright, laterally-spaced polygonal hoops, each having a bottom section, a lower front section leading upwards from a front end of the bottom section, an upper front section sloping upwardly and rearwardly from the lower front section, a top section extending rearwardly from the upper front section and positioned above the bottom section, an upper rear section extending downwardly from the rear end of the top section and a lower rear section extending upwardly from the rear end of the bottom section;

a plurality of laterally-oriented cross members joining the hoops and including:

floor members joining the hoops adjacent the bottom section thereof to provide a substantially flat floor frame;

roof members joining the hoops adjacent the top sections thereof to provide a substantially flat roof frame, a front member joining the upper front sections of the hoops, and rear members joining the upper rear sections of the hoops and joining the lower rear sections of the hoops;

rear frame means comprising members extending rearwardly from the hoops and at least one laterally-extending member adjacent the rear end of the frame;

two upright front door posts extending across the respective hoops adjacent the front ends of the bottom sections; and two rear door posts extending across the respective hoops at positions spaced rearwardly from the front door posts;

each hoop enclosing a door opening that is unobstructed between the floor frame and the roof frame and between the door posts.

2. A frame according to claim 1 wherein the rear frame means comprise side frame members extending rearwardly from the rear door posts and a lateral rear member joining the side frame members.

3. a frame according to claim 2 wherein the side frame members comprise two vertically-spaced members on each side of the frame, connected to the respective upper rear and lower rear sections of the hoops.

4. A frame according to claim 1 including support members extending from the front member to the rear member joining the lower rear sections of the hoop and shaped to conform with the lower front section, bottom section and lower rear section of each hoop.

5. A frame according to claim 1 where each hoop comprises a single tube.

6. A frame according to claim 1 wherein each hoop comprises a single tube and each cross member comprises a tube.

7. A vehicle for street use having a front end and a rear end, and comprising:

a frame comprising two upright, laterally-spaced hoops, each with a roof section, a floor section beneath the roof section, a front section sloping downwardly to the front from the roof section and a rear section extending downwardly from the roof section;

a plurality of laterally-oriented frame members joining the hoops to form a space frame with spaced roof and floor frame sections;

a plurality of panels mounted to the inside of the frame and including:

a windshield secured to the frame between the front sections of the hoops;

front body panel means secured to the frame between the front sections of the hoops;

front body panel means secured to the frame between the hoops and extending from the windshield to the floor panel; and back panel means secured to the rear section of the frame below and to the rear of the roof panel; and a cargo container supported by the frame below and to the rear of the back panel.

8. A vehicle according to claim 7 wherein the back panel means comprises a window.

9. A vehicle according to claim 8 including door openings extending between the roof and floor sections of the frame hoops, door panels and means mounting the door panels on the frame for movement from closed positions extending across and closing the respective door openings and open positions spaced from the door openings.

* * * * *